Jan. 28, 1947.　　　C. C. MARTIN　　　2,414,960
FRICTION RESPONSIVE MECHANISM
Filed July 19, 1945
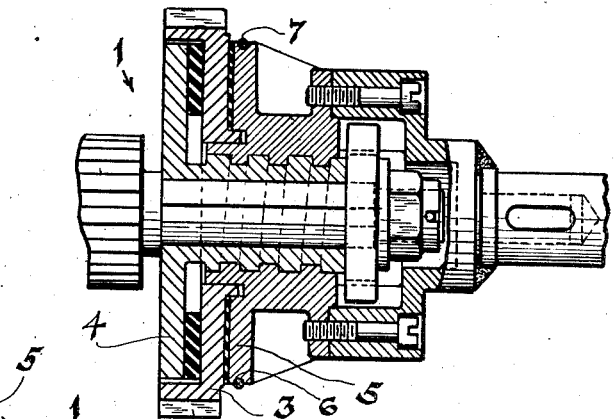
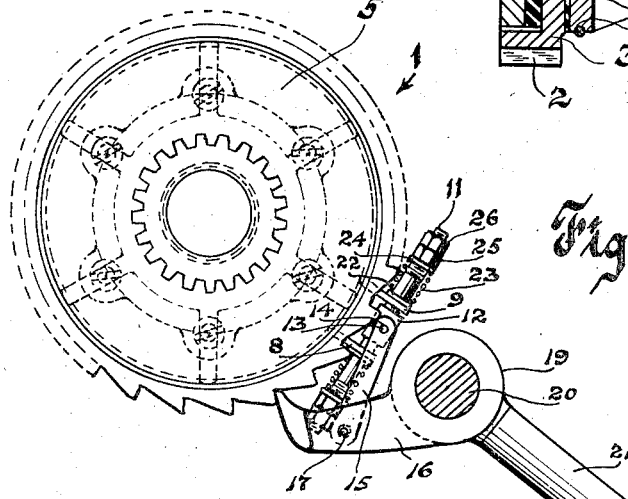
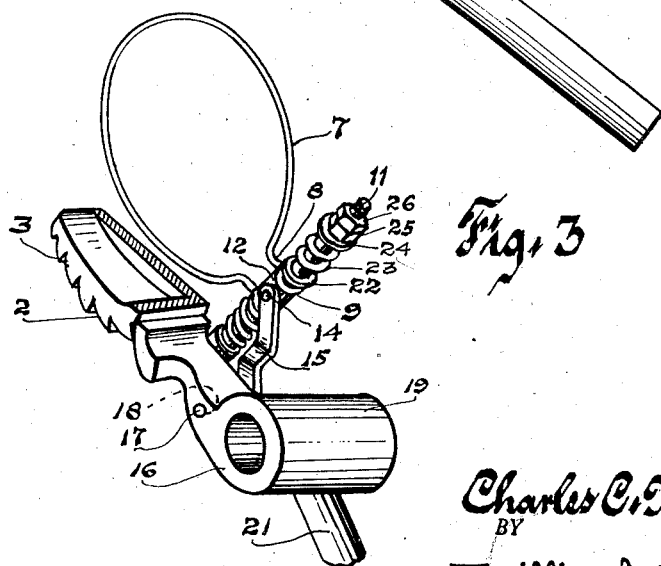
INVENTOR.
Charles C. Martin,
BY William J. Wesseler,
ATTORNEY.

Patented Jan. 28, 1947

2,414,960

UNITED STATES PATENT OFFICE 2,414,960

FRICTION RESPONSIVE MECHANISM

Charles C. Martin, Cleveland Heights, Ohio, assignor to David Round & Son, Garfield Heights, Ohio, a firm Application July 19, 1945, Serial No. 605,865

3 Claims. (Cl. 192—15)

This invention, as indicated, relates to a friction responsive mechanism. More particularly, it comprises an apparatus having an element frictionally engaged with a rotatable member and movable in the direction of rotation, and serving to move or drive associated parts in response to the frictional driving force derived from such rotating member.

The invention has many fields of application, but is of especial utility in connection with devices for controlling other apparatus. In the embodiment of the invention herein illustrated it has been applied as means for controlling the position of a pawl in a pawl and ratchet mechanism for a winch, but it is to be understood that other uses within the scope of the claims are also in view.

The mechanism may be used to move an element positively within the limits of frictional adjustment, in one direction and then positively in the same manner, upon the reverse movement of the rotatable member, in the opposite direction. It may be provided with a lost motion connection to vary such movement.

The embodiment of the invention herein disclosed has in view its application to a winch type of mechanism wherein the pawl is moved to a position slightly outwardly of the path of movement of the ratchet teeth when the winch is being operated to lift a load, and is moved into normal engagement with the ratchet teeth when such lifting movement is completed.

The principal object of the present invention is to provide a friction responsive mechanism adapted to be engaged on a rotatable element and move or drive associated parts through the driving force derived from such frictional engagement.

Another object of the present invention is to provide a pawl control means to position the pawl of a ratchet mechanism slightly outwardly of the path of movement of the ratchet teeth during the inactive period of the pawl as a holding element, and to position the pawl for engagement with the ratchet teeth during the active period of the pawl as a holding element.

Another object of the invention is to provide a mechanism of light weight and long service life, responsive to frictional driving movement from a rotatable member, adjacent a ratchet mechanism, which will move the pawl to a position slightly outwardly of the path of movement of the ratchet teeth to prevent wear, vibration and noise at times when the pawl is out of active holding engagement with the ratchet teeth.

Another object of the invention is to provide a pawl control mechanism having a light frictional engagement with a rotatable element adjacent a pawl and ratchet mechanism and which is subject to precision adjustment and adapted to control the spacing of the pawl from the ratchet teeth at times when the pawl is not in active holding engagement.

A further object of the invention is to provide a pawl control element in the form of a piano wire loop riding in a narrow groove on a rotatable element adjacent a pawl and ratchet mechanism and having connections with the pawl to lift the same in response to frictional engagement of said wire loop within said groove and the motion of said rotating element in a predetermined direction.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but several of various forms in which the principle of the invention may be used.

In said annexed drawing:

Figure 1 is a side elevation, showing a pawl and ratchet mechanism as applied to a winch with a pawl control mechanism embodying the principles of the invention;

Figure 2 is a fragmentary longitudinal vertical sectional view of the clutch members of a winch, showing the position of the pawl control mechanism with reference to the pawl and ratchet teeth; and Figure 3 is a perspective view of the pawl control mechanism detached from the friction groove on the rotatable member and with the pawl separated from its supporting elements.

As is clearly shown in the drawing, the winch 1 may correspond with a well-known type of structure wherein the ratchet teeth 2 are distributed about the circumference of a clamping plate 3 supported for free rotation between a drum disc 4 and a movable clamping member 5 which may be of the safety lowering type wherein the drum must be progressively released by reverse rotation of the crank or other hoisting mechanism. A circumferential groove 6 is formed around the circumference of the clamping end portion of the movable clamping member 5, the groove being preferably of small size and adapted to receive a piano wire loop 7 extending substantially completely around the groove member, and having its extreme ends 8 turned outwardly at substantially right angles and formed with terminal loops 9. The loops are engaged over a loop adjusting bar 11 having a central cylindrical enlargement 12 provided with a transverse aperture 13 through which a pivot pin 14 extends transversely, securing the adjusting bar to a pawl link 15. The pawl link is offset adjacent its free end a distance sufficient to bring it into contact with the inner face of the pawl 16 to which it is secured by means of a pivot pin 17 extending through a transverse aperture 18 formed in the engaging element of the pawl mechanism which is formed integrally with a hub portion 19, centrally apertured to engage upon the pawl supporting pivot 20 mounted upon the body portion of the winch. An operative handle for the pawl 21 is engaged with the pawl hub on its lower side opposite the position of the active pawl member and preferably at a substantially similar angle to the point of support.

The loop adjusting bar 11 is of a length sufficient to receive outwardly of its central cylindrical enlargement 12 on its opposite ends respectively the terminal loops 9 at the respective ends of the piano wire loop 7, an inner washer 22, an expansion coil spring 23, an outer washer 24, and an adjusting nut 25 with a lock nut 26. Thus any predetermined degree of frictional adjustment may be provided over the piano wire loop 7 to insure a sufficient degree of frictional driving pressure from the walls of the groove 6 on the rotatable member 5, to insure the lifting of the pawl when the rotatable member is operated in the hoisting direction and to release the pawl for normal operative engagement with the ratchet teeth when the rotatable member is operated in the lowering direction.

The operation of the pawl control mechanism is in itself automatic, but is dependent upon the direction of motion imparted to the rotational member with which the piano wire is engaged. The degree of frictional adjustment is so slight, and the amount of metal in contact is so small that there is substantially no wear upon the wire. The mechanism associated with the wire loop is not subjected to any heavy strains and may be maintained in adjustment over long periods of time without attention.

The advantages of the pawl control mechanism are readily apparent upon the use of the device, inasmuch as the wear and vibration incident to the operation of a winch or the like is eliminated, and the winch mechanism is substantially noiseless. The dependable operation of the pawl is in no way affected through the use of the pawl control mechanism inasmuch as the degree of friction utilized in operating the mechanism is very slight, and there is instantaneous response to movement in the opposite direction to release the pawl for its normal operation.

The control mechanism may be restricted in reverse movement and may have a lost motion connection with the pawl so that the control mechanism does not oscillate with the pawl during the hoisting operation of a winch. However, as stated, the pawl control mechanism may positively move the pawl in each direction of motion when no lost motion connection and stop member is provided, and this may be the sole pawl engaging means employed or may be in addition to other means such as is conventionally provided.

It will be noted that in the application of the control mechanism to a safety lowering type of winch such as is illustrated, the plane of operation of the piano wire loop is offset from the plane in which the pawl and ratchet are positioned. In view of the fact that there is transverse movement of the clamping member 5 toward and away from the drum disc 4, pivotal action in relation to the pawl will take place about the pivot 20 supporting the pawl, and also around the axis of the adjusting loop bar 11, as the clamping member 5 is moved toward and away from the disc 4. The pawl may thus be said to be connected by a species of a universal joint with a friction responsive piano wire loop. The parts are of such small size and light weight that the elements of the mechanism may respond immediately to any of the adjustments required by the movement of the other parts.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. In a pawl control mechanism the combination of a circular ratchet member associated with a rotatable unit, a pawl cooperating with said ratchet member, mounted on a support with which said ratchet member has relative movement, a circumferentially grooved member rotatable in a plane parallel to, and spaced transversely from the plane of said ratchet member, and means for moving said grooved member toward and away from said ratchet member, a friction loop engaged in said groove, and a double pivoted means connecting said loop and said pawl to provide for transverse movement of said grooved member, and frictional control of said pawl position with reference to the ratchet teeth.

2. In a safety lowering winch apparatus the combination of a circular ratchet member, operatively related to a drum, a circumferentially grooved member rotatable in a plane parallel to, and spaced transversely from the plane of said ratchet member, and means for moving said grooved member toward and away from said ratchet member, a wire loop engaged in said groove and double pivoted means connecting said loop and said pawl to provide for transverse movement of said grooved member, and frictional control of said pawl position with reference to the ratchet teeth.

3. An apparatus of the character described having in combination a pawl and ratchet having relative movement to each other, a pawl control mechanism pivotally connected with the pawl adjacent its active end and adapted to move the pawl toward and away from the ratchet member, a rotatable support for the pawl control mechanism frictionally engaged therewith, said pawl control mechanism having a loop of wire engaged about the rotatable member, terminal elements at the ends of said wire in spaced relation to each other, an adjusting bar engaged through said terminal elements, and clamping means mounted on the adjusting bar, including resilient abutments, adjusting nuts adapted to vary the degree of pressure of said resilient abutments upon the terminal members and lock nuts to hold said adjusting nuts in permanent adjustment, whereby the frictional adjustment of said wire with its rotatable support may be provided with any predetermined degree of frictional engagement.

CHARLES C. MARTIN.